(12) United States Patent
Carasso et al.

(10) Patent No.: US 7,331,104 B2
(45) Date of Patent: Feb. 19, 2008

(54) DEVICE FOR THE ASSEMBLY OF STANDARD ELEMENTS INTENDED FOR THE CREATION OF PRECISION MECHANICAL STRUCTURES

(76) Inventors: Philippe Carasso, 17 Bis Boulevard Victor Hugo, 92200 Neuilly sur Seine (FR); Bruno Leneveu, 11 Avenue Charles Auguste, 92700 Colombes (FR); Laurent Norjoux, 77 Chemin du Guette Lievre, 91580 Auvers Saint-Georges (FR); Philippe Rocton, 21 Rue de la d'huis, 77860 Quincy Voisin (FR)

( * ) Notice: Subject to any disclaimer, the term of this patent is extended or adjusted under 35 U.S.C. 154(b) by 0 days.

(21) Appl. No.: 10/977,148

(22) Filed: Oct. 29, 2004

(65) Prior Publication Data

US 2005/0150103 A1 Jul. 14, 2005

(30) Foreign Application Priority Data

Jan. 9, 2004 (FR) .................................. 04 00158

(51) Int. Cl.
 *B23P 19/00* (2006.01)
(52) U.S. Cl. ......................................... 29/799; 901/30
(58) Field of Classification Search .................. 29/799; 403/DIG. 9; 292/256.6, 256.65, 256.67, 292/256.69; 24/455, 488, 489, 514, 519, 24/517; D08/394–398
See application file for complete search history.

(56) References Cited

U.S. PATENT DOCUMENTS 1,185,487 A * 5/1916 Eastman ..................... 285/119
1,826,947 A * 10/1931 Nelson ........................ 220/321
2,689,141 A * 9/1954 Kiekhaefer .................. 285/409
3,201,156 A * 8/1965 Coats .......................... 285/365
3,246,793 A * 4/1966 Wade .......................... 220/321
3,248,018 A * 4/1966 Fleischman ................. 222/196
3,817,564 A * 6/1974 Baldwin et al. ........ 292/256.67
4,377,245 A * 3/1983 Patty .......................... 220/822
4,471,979 A * 9/1984 Gibb et al. .................. 285/373
4,708,512 A * 11/1987 Allert .......................... 403/344
4,776,721 A * 10/1988 Lange ......................... 403/171
6,349,912 B1 * 2/2002 Schauss et al. ........... 248/298.1
6,523,230 B1 * 2/2003 Weinhold ..................... 24/273
6,568,626 B2 * 5/2003 Fontaine ..................... 244/1 R

* cited by examiner

*Primary Examiner*—David P. Bryant
*Assistant Examiner*—Christopher M Koehler
(74) *Attorney, Agent, or Firm*—Raggio & Dinnin, P.C.

(57) ABSTRACT

A device for the assembly of at least two standard elements of a precision mechanical structure by a linking element, where the first standard element includes a reference surface, while the second standard element includes a bearing surface which has to be positioned with precision in an orthonormal coordinate system associated with the aforementioned reference surface, given that the connection between the linking element and at least one of the standard elements includes two contact faces provided on the linking element and the standard element. A clamp composed of two half collars, and presenting shapes which interlock with the corresponding shapes of the linking element and of the standard element in such a way that the clamping of the two half collars causes the application and the centering of the two aforementioned contact faces against each other.

6 Claims, 8 Drawing Sheets

DEVICE FOR THE ASSEMBLY OF STANDARD ELEMENTS INTENDED FOR THE CREATION OF PRECISION MECHANICAL STRUCTURES

BACKGROUND OF THE INVENTION

1. Field of the Invention

This present invention concerns a device for the assembly of standard elements intended for the creation of precision mechanical structures.

2. Description of Related Art

It applies in particular, but not exclusively, to the creation of tools for the gripping of mechanical parts intended in particular for the automobile industry. It is usable in particular on assembly lines for parts of the bodywork of automobiles which require gripping tools or grippers, which are firmly attached to fixed supports or mobile supports such as the heads of robots. It is used to position, with precision and in a repeatable manner, the aforementioned mechanical parts during their assembly on automobile assembly lines. It also allows said grippers to conform to the nature of the mechanical parts to be processed and to the type of operation to be performed on said mechanical parts.

We know in fact that such grippers are designed and manufactured to order in accordance with the nature of the mechanical parts to be processed, and in particular with their geometry, with the type of operation to be performed, and especially with the trajectories to be followed by said mechanical parts.

These grippers are generally manufactured in steel or aluminium alloy tubing, or in aluminium alloy bar. The dimensions of these connecting elements are determined by the loads to be supported and by the precision of the positioning required. As such, they therefore constitute tools which have to be matched to specific requirements, and which necessitate a high degree of rigidity combined with the lowest possible mass. As a consequence, their production cost is high, because the process is one which can be described as artisanal, given the diversity of the mechanical parts to be employed. In addition, in the event of failure or of damage, the stocking of such grippers constitutes an additional cost, greatly increasing their repair costs.

In order to remedy these drawbacks, the invention proposes to create grippers from arms which are firmly attached to a support block, such arms being implemented in the shape of an assembly of sections of extruded aluminium alloy bar which has been processed so as to obtain the desired shape.

This solution allows the weight of the gripper to be reduced while also providing a certain rigidity that guarantees the required precision and repeatability. It also results in less costly maintenance, in view of the ability to replace any defective elements. Finally, it allows the gripper to be reconfigured in order to make it compatible with different mechanical parts.

The drawback of this type of gripper results from the method of assembly of the bar sections, which is performed using assembly bolts and centring pins. Such an assembly method leads to high production costs for the pin housings and for the threaded orifices, as well as high assembly costs for the mating of the pins with their housings and the number of tightening operations necessary.

Given the problems mentioned above, the invention particularly has the aim of facilitating the assembly operations and reducing the costs associated with the production and assembly operations.

SUMMARY OF THE INVENTION

A device for the assembly of at least two standard elements of a precision mechanical structure by means of a linking element, where the first standard element includes a reference surface while the second standard element includes a bearing surface which has to be positioned with precision in a orthonormal coordinate system associated with the aforementioned reference surface, characterized in that the connection between the linking element and at least one of said standard elements includes:

- two contact feces provided on said linking element and said standard element respectively,
- a clamp composed of two half collars, held together by tightening means, presenting shapes which interlock with the corresponding shapes of said linking element and of said standard element in such a way that the tightening of the two half collars causes the application and the centering of the two aforementioned contact faces against each other.

Advantageously, the contact faces of the aforementioned standard elements and connecting elements which have to be associated will be composed of end cheek-plates, of circular shape, which may or may not include angular positioning elements such as at least a flat part or an assembly of the tenon/mortise type or at least one cylindrical pin mounting.

In addition, at least two connecting elements can be assembled by means of junction elements associated with transition elements, where said junction elements can be of cubic or prismatic shape so as to position the connecting elements, in relation to each other, in accordance with orthogonal or oblique directions respectively. Said transition elements will be firmly attached to the junction elements by means of tightening elements, and positioned by means of an assembly of the tenon/mortise type. The association of the linking element to the transition element is effected by clamps composed of half collars hinged to each other at one of their ends and with clamping means at the other end.

Likewise, the standard element, which includes the bearing surface, can be of the non-adjustable or adjustable type. In the second case, the aforementioned bearing surface can be positioned in relation to the end cheek-plate with at least one degree of freedom.

Furthermore, the linking element, composed of a connecting section and two end cheek-plates can be of different lengths, and can therefore satisfy the requirements of the needs expressed. It can also include orifices which are positioned in parallel with the principal axis of said linking element so as to allow the passage of fluid circuits, electrical circuits or control devices.

Thus the assembly of standard elements composed of connecting elements of different lengths, associated with adjustable and non-adjustable standard elements, where the connecting elements can be held together by junction elements allowing them to be positioned in different directions, can constitute a gripper that includes multiple bearing surfaces referenced in relation to a reference surface or in relation to at least one other bearing surface constituting the aforementioned reference surface.

These different standard elements will be designed so as to satisfy the requirements of precision, rigidity and low mass which are necessary for the creation of grippers. Thus, for example, the connecting elements will be created from extruded aluminium-alloy bar. The adjustable standard elements will include precise positioning devices in translation or in rotation. The clamps composed of half collars will be in shape conformity with the end cheek-plates, complying with the precision and rigidity requirements. This will also apply to the assembly of the tenon/mortise type, allowing association of the standard elements and transition elements.

Methods for the implementation of the invention will be described below, as non-limited examples, with reference to the appended figures, in which.

BRIEF DESCRIPTION OF THE DRAWINGS

DESCRIPTION OF THE PREFERRED EMBODIMENT

Figure 1:
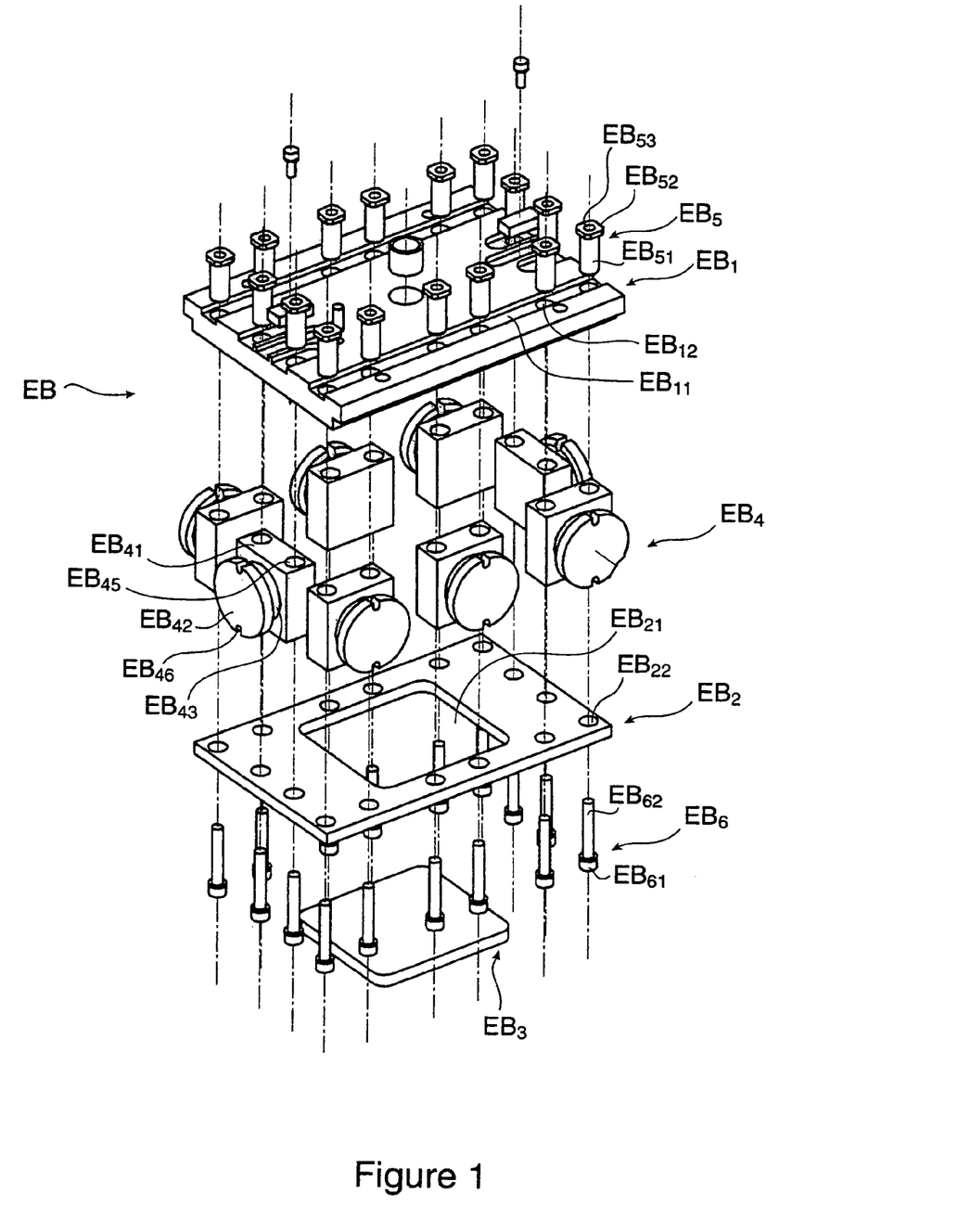
FIG. 1 is a perspective view of a basic element, shown in exploded form.

In the example shown in FIG. 1, the basic element EB essentially includes a top plate EB1, of rectangular shape, a bottom plate EB2 of rectangular shape identical to that of the top plate EB1, an inspection plate EB3 associated with the bottom plate EB2, and a certain number of basic transition elements EB4, of which there are 8 in the present case, positioned between the top plates EB1 and bottom plates EB2.

Thus, by means of the top plate EB1, the basic element EB is used to fix the assembly of standard elements according to the invention, constituting a gripper, to a fixed support or a mobile support such as the head of a robot.

The top surface of the aforementioned top plate EB1 will constitute the so-called reference surface of the gripper.

The top plate EB1, includes grooves EB11, positioned in parallel with the large dimension of said top plate EB1, and cut into the top face of said top plate EB1. Said grooves EB11, also include circular orifices EB12 passing through the plate at the bottom of the groove.

The aforementioned bottom plate EB2, identical in length and width to those of the top plate EB1, includes a rectangular opening EB21 which acts as an access door, and this rectangular opening EB21 is associated with a plate EB3, of corresponding shape and fixed solidly to said bottom plate EB2 by appropriate means. The aforementioned bottom plate EB2 also includes circular orifices EB22, passing through the wall of said bottom plate EB2, the axes of which are co-linear with the axes of the circular orifices EB12 in the top plate EB1.

A certain number of basic transition elements EB4 are located between the aforementioned top plates EB1 and bottom plates EB2. In the present case, there are 8 of these.

Each basic transition element EB4 includes a parallelepiped element EB41, a cheek-plate of circular section EB42 and a connecting element EB43, joining the body element EB41 to the cheek-plate EB42 of circular section. In addition each body element EB41 includes two circular, orifices EB45 whose axes are parallel to the axes of orifices EB12 and EB22.

Thus, taken in pairs, the aforementioned orifices EB45, EB22 and EB12, have a co-linear axis, and are used to join the different basic elements EB4 between the top plates EB1 and bottom plates EB2 by means of cylindrical bushings EB5 and shoulder-headed bolts EB6.

In fact, the aforementioned cylindrical bushings EB5 include a cylindrical part EB51 that fits into in the circular orifice EB12 of the top plate EB1, and the circular orifice EB45 of the basic transition element EB4, a shoulder EB52 of rectangular or square section that fits into a corresponding shape in the groove EB11 of the top plate EB1, and a threaded orifice EB53 whose axis is co-linear with that of the cylindrical part EB51.

In addition, the aforementioned shoulder-head bolts EB6 include a head EB61 which bears onto the bottom surface of the bottom plate EB2, and a threaded part EB62 that screws into the threaded orifice EB53 of the corresponding cylindrical bushing EB5.

Furthermore, each of said cheek-plates EB42 of the basic transition elements EB4 includes, on its periphery, at least one indentation EB46 whose width is equal to the diameter of the hinging swivel-pin of the clamps, which will be described later.

Figure 2:
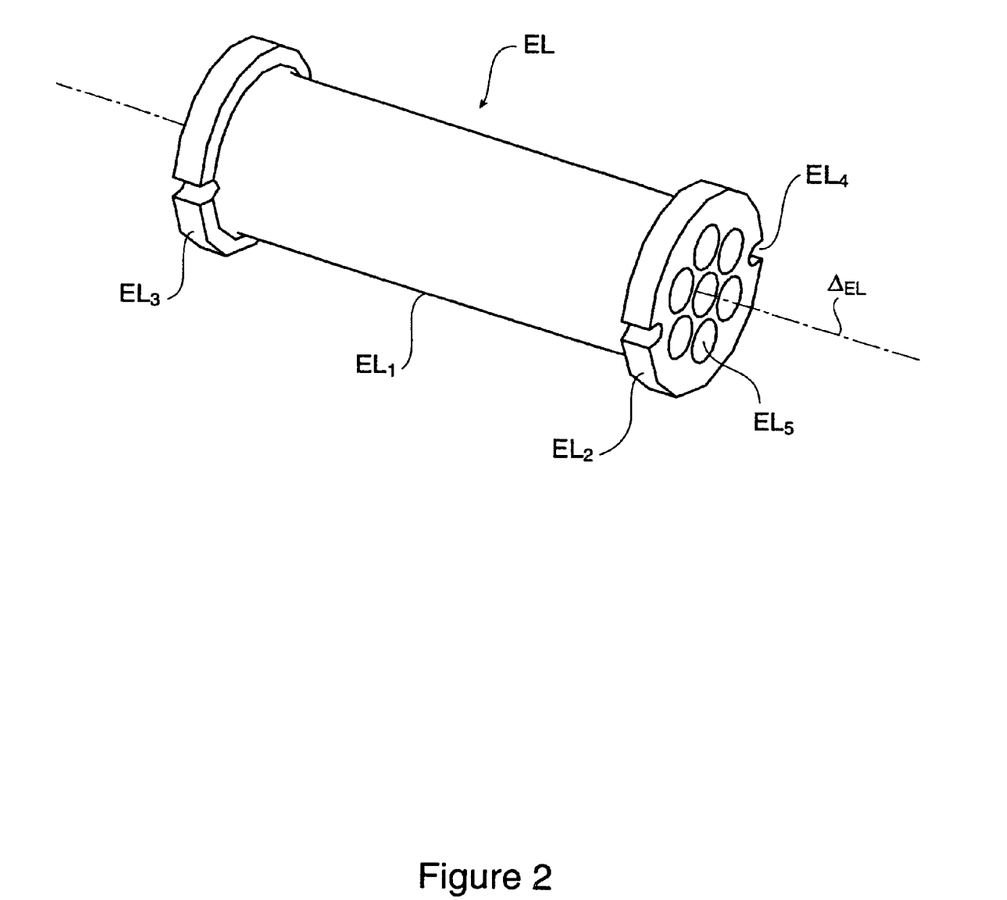
FIG. 2 is a perspective view of a linking element.

In the example shown in FIG. 2, the linking element EL is composed of a length EL1 of circular section, and two cheek-plates EL2 and EL3, also of circular section. The axes of symmetry of the length EL1, and of the cheek-plates EL2 and EL3, are co-linear with the principal axis ΔEL of the linking element EL. The distance separating the two external faces of the cheek-plates EL2 and FL3 determines the length of the linking element EL.

Thus, several lengths will be provided in this way, separated by a constant or variable distance, allowing the length combinations necessary for the gripper design.

In addition, each of said cheek-plates includes, at its periphery, at least one indentation EL4 whose width is equal to the diameter of the hinging swivel-pin of the clamps to be described later. The aforementioned indentation EL4 is used to position the linking element EL angularly in relation to the element that will be associated with it.

Advantageously, the linking element will include orifices EL5 positioned in parallel with the axis ΔEL. Their section can be circular or any other shape. Their purpose is to reduce the mass of the linking element EL, though without compromising the rigidity of said linking element EL. They can also be used to accommodate fluid circuits, electrical circuits or control devices that have to pass through the linking element EL. In addition, the section of the linking element EL1 can be square, polygonal, or any other shape, so as to constitute, with the orifices EL5, a compromise between a minimum surface area and a maximum principal moment of inertia along the two orthogonal directions of inertia.

In the example shown in FIG. 3, the non-adjustable terminal elements ETA, ETB, and ETC, are composed essentially of a cheek-plate ET1, of circular section, centred on the principal axis ΔET, and including on their periphery at least one indentation ET7 whose width is equal to the diameter of the hinging swivel-pin of the clamps to be described later, of a body element ET2 and ET3, that includes a bearing surface, rectangular or circular respectively, and a body element ET4, ET5 and ET6 constituting the link between the cheek-plates ET1 and the body element constituting the bearing surfaces.

Figure 3:
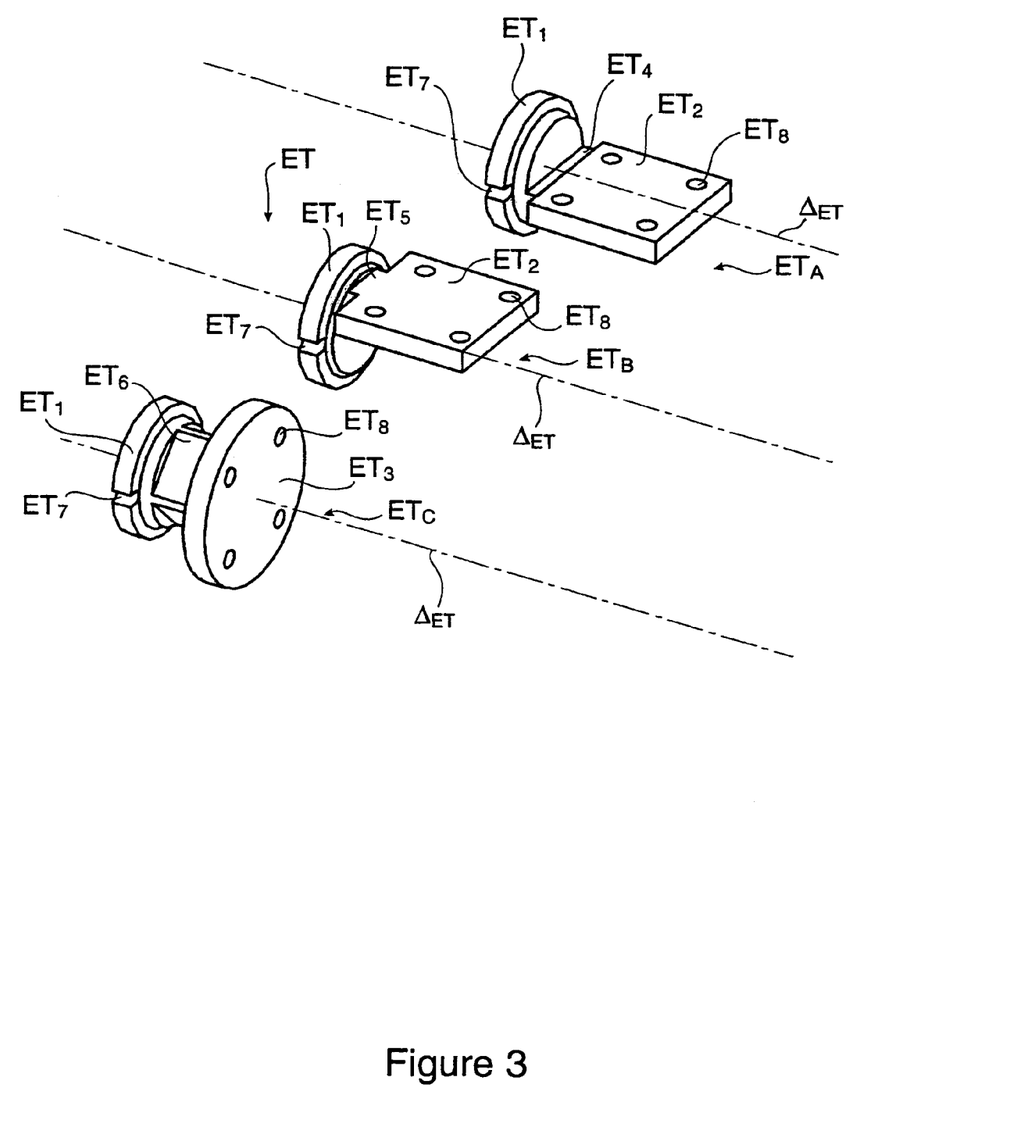
FIG. 3 is a perspective view of non-adjustable terminal elements.

Thus, as an example, three types of non-adjustable terminal elements ETA, ETB and ETC, shown in FIG. 3, are used respectively to obtain a rectangular bearing surface containing the principal axis ΔET, a rectangular bearing surface that is offset in relation to the principal axis ΔET, and a circular bearing surface on the principal axis ΔET.

In addition, as an example, four orifices ET8 are created perpendicularly to the aforementioned bearing surfaces, providing the connection between the mechanical part to be processed and the assembly according to the invention, constituting the gripper.

Figure 4:
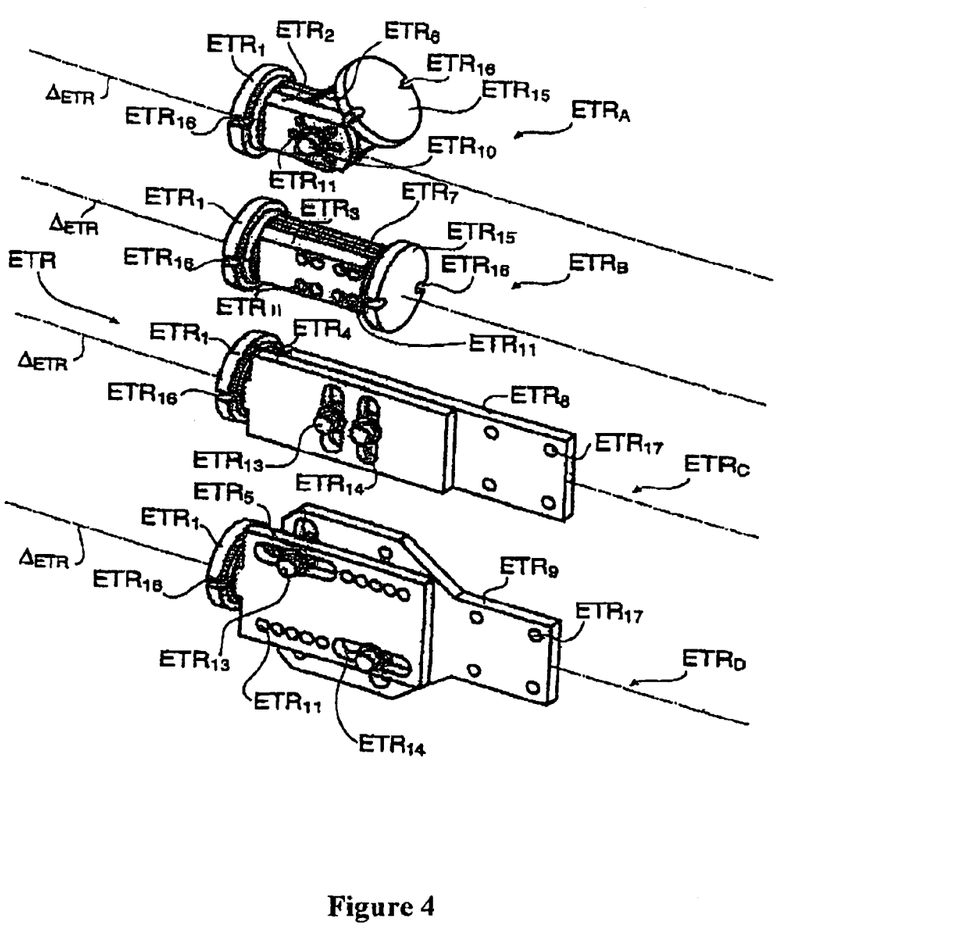
FIG. 4 is a perspective view of adjustable terminal elements.

In the example shown in FIG. 4, the adjustable terminal elements ETRA, ETRB, ETRC and ETRD are composed essentially of a cheek-plate ETR1, of circular section, centred on the principal axis ΔETR, and include on their periphery at least one indentation ETR16 whose width is equal to the diameter of the hinging swivel-pin of the clamps to be described later, of a body element ETR2, ETR3, ETR4 and ETR5 firmly attached to the corresponding cheek-plate ETR1, and of a mobile element ETR6, ETR7, ETR8 and ETR9 respectively in relation to the aforementioned element ETR2, ETR3, ETR4 and ETR5 including either a circular bearing surface or a rectangular bearing surface.

The first example of an adjustable terminal element ETRA includes a cheek-plate ETR15 of circular section, attached to the mobile element ETR6, and constituting the bearing surface of the terminal element ETRA. Said mobile element ETR6 is able to pivot around an axis perpendicular to the principal axis ΔETR by means of a shaft ETR10 mounted to rotate in the fixed clement ETR2. Thus the axis of symmetry of the cheek-plate ETR15 is able to pivot in the plane containing the principal axis ΔETR by an angle greater than 90° on either side of said principal axis ΔETR. Advantageously, the cheek-plate ETR15 can include, on its periphery, at least one indentation ETR16 whose width is equal to the diameter of the hinging swivel-pin of the clamps to be described later. Moreover, the locking into angular position of the mobile element ETR6 in relation to the fixed element ETR2 will be effected by means of a pin placed in at least one circular orifice ETR11 located around the axis of rotation of said mobile element ETR6.

The second example of an adjustable terminal element ETRB includes a cheek-plate ETR15 of circular section, attached to a mobile element ETR7, and constituting the bearing surface of the terminal element ETRB. Said mobile element ETR7 is able to slide in parallel with the principal axis ΔETR. Thus the axis of symmetry of the cheek-plate ETR15 will be co-linear with the principal axis ΔETR. Advantageously, the cheek-plate ETR15 can include, on its periphery, at least one indentation ETR16 whose width is equal to the diameter of the hinging swivel-pin of the clamps to be described later. In addition, the locking of the mobile element ETR7 in a longitudinal position in relation to the fixed element ETR3 will be effected by means of a dowel pin placed in at least one circular orifice ETR11 placed perpendicularly to the principal axis ΔETR.

The third example of an adjustable terminal element ETRC includes a mobile element ETR8 in relation to the fixed element ETR4, and constituting the bearing surface of the terminal element ETRC. Said mobile element ETR8 is able to slide perpendicularly to the principal axis ΔETR. In addition, the locking of the mobile element ETRB in a transverse position in relation to the fixed element ETR4 will be effected by means of a shoulder-headed screw ETR13, thread mounted in the mobile element ETR8 and which is able to slide in at least one oblong orifice ETR14 whose longitudinal axis is perpendicular to the principal axis ΔETR. Also, as an example, four orifices ETR17 are created perpendicularly to the aforementioned bearing surface, allowing the connection to be made between the mechanical part to be processed and the assembly according to the invention, constituting the gripper.

The fourth example of an adjustable terminal element ETRD includes a mobile element ETR9 in relation to the fixed element ETR5, and constituting the bearing surface of the terminal element ETRD. Said mobile element ETR9 is able to slide perpendicularly to the principal axis, ΔETR and along the principal axis ΔETR. In addition, the locking in the transverse position and in the longitudinal position of the mobile element ETR9 in relation to the fixed element ETR5 will be effected by means of at least one bolt ETR13, which is able to slide in two oblong orifices ETR14 whose longitudinal axes are perpendicular and parallel to the principal axis ΔETR respectively. Advantageously, the locking in the transverse position and in the longitudinal position of the mobile element ETR9 in relation to the fixed element ETR5 will be effected by means of a dowel pin placed in at least one circular orifice ETR11 positioned perpendicularly to the principal axis ΔETR. Also, as an example, four orifices ETR17 are created perpendicularly to the aforementioned bearing surface, providing the connection between the mechanical part to be processed and the assembly according to the invention, constituting the gripper.

Figure 5:
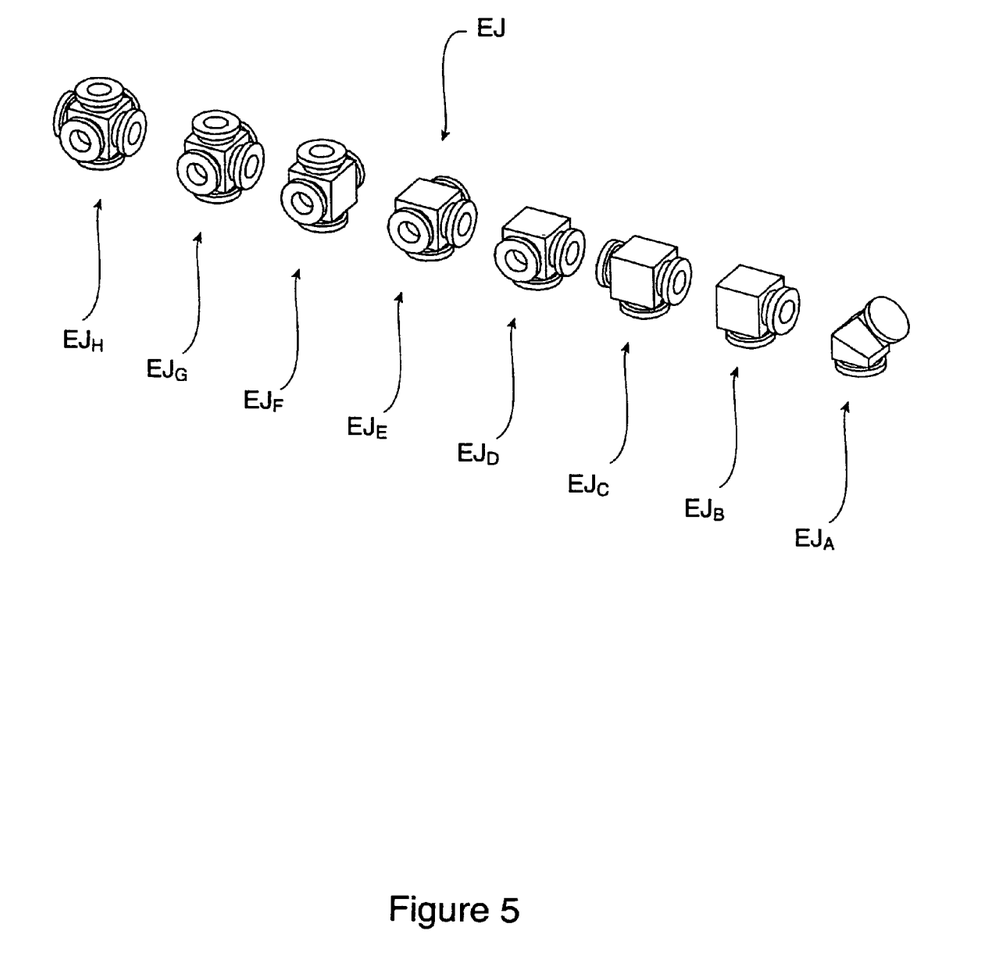
FIG. 5 is a perspective view of junction elements.

In the example shown in FIG. 5, the junction element EJA is composed essentially of a principal prismatic element, and the junction elements EJB, EJC, EJD, EJE, EJF, EJG, and EJH are composed essentially of a principal cubic element. Thus the bearing faces of the prism or of the cube can receive at least one transition element ETT which will be described later. In fact the aforementioned junction element EJA is able to receive two junction elements ETT. The bearing faces make an angle which can vary between 0° and 90°, and preferably equal to 30°, or 45°, or 60°.

The aforementioned junction elements EJB, EJC, EJD, EJE, EJF, EJG and EJH can receive 2, 3, 3, 4, 4, 5 and 6 junction elements ETT respectively, corresponding to the different possible combinations, given the six faces of a cube.

Figure 6:
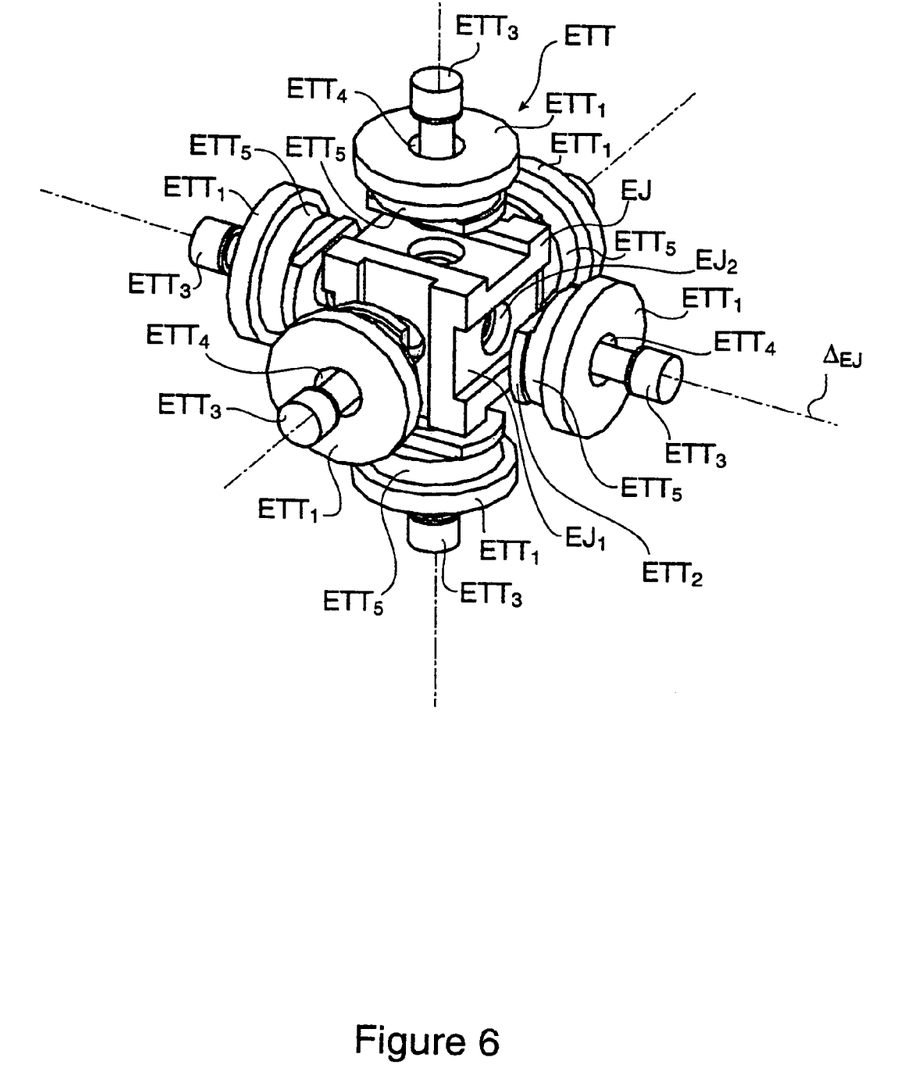
FIG. 6 is a perspective view of a junction element associated with transition elements.

In the example shown in FIG. 6, the junction element EJ is composed essentially of a principal cubic element. Each of the six faces of said principal cubic element EJ includes a mortise EJ1 whose longitudinal axis contains the centre of the corresponding face and whose length is equal to the length of said corresponding face.

In addition, each of the six faces of said principal cubic element EJ includes a threaded circular orifice EJ2 whose principal axis is perpendicular to the corresponding face, and contains the centre of said corresponding face.

Thus, each of the six faces of the principal cubic element EJ can receive a transition element ETT, which is composed of a cheek-plate ETT1 of circular section, a pin mounting ETT2, and a connecting element ETT5, which can be of circular section, linking said cheek-plate ETT1 to said tenon ETT2.

The assembly composed of the cheek-plate ETT1, the tenon ETT2 and the connecting element ETT5, is traversed by a circular orifice ETT4 whose principal axis contains the centre of said cheek-plate ETT1.

The tenon ETT2 will be of a shape to correspond with the mortise EJ created in the bearing face of the junction element EJ receiving the corresponding transition element ETT.

A shoulder-head screw ETT3 will bear upon the external face of the cheek-plate ETT1, and will hold the transition element ETT by a tightening operation on the threaded part of the screw ETT3 in the threaded circular orifice EJ2.

Advantageously, the same principle for attaching the transition element ETT to the prismatic-type junction element can be applied to the two faces of said junction element.

Figure 7:
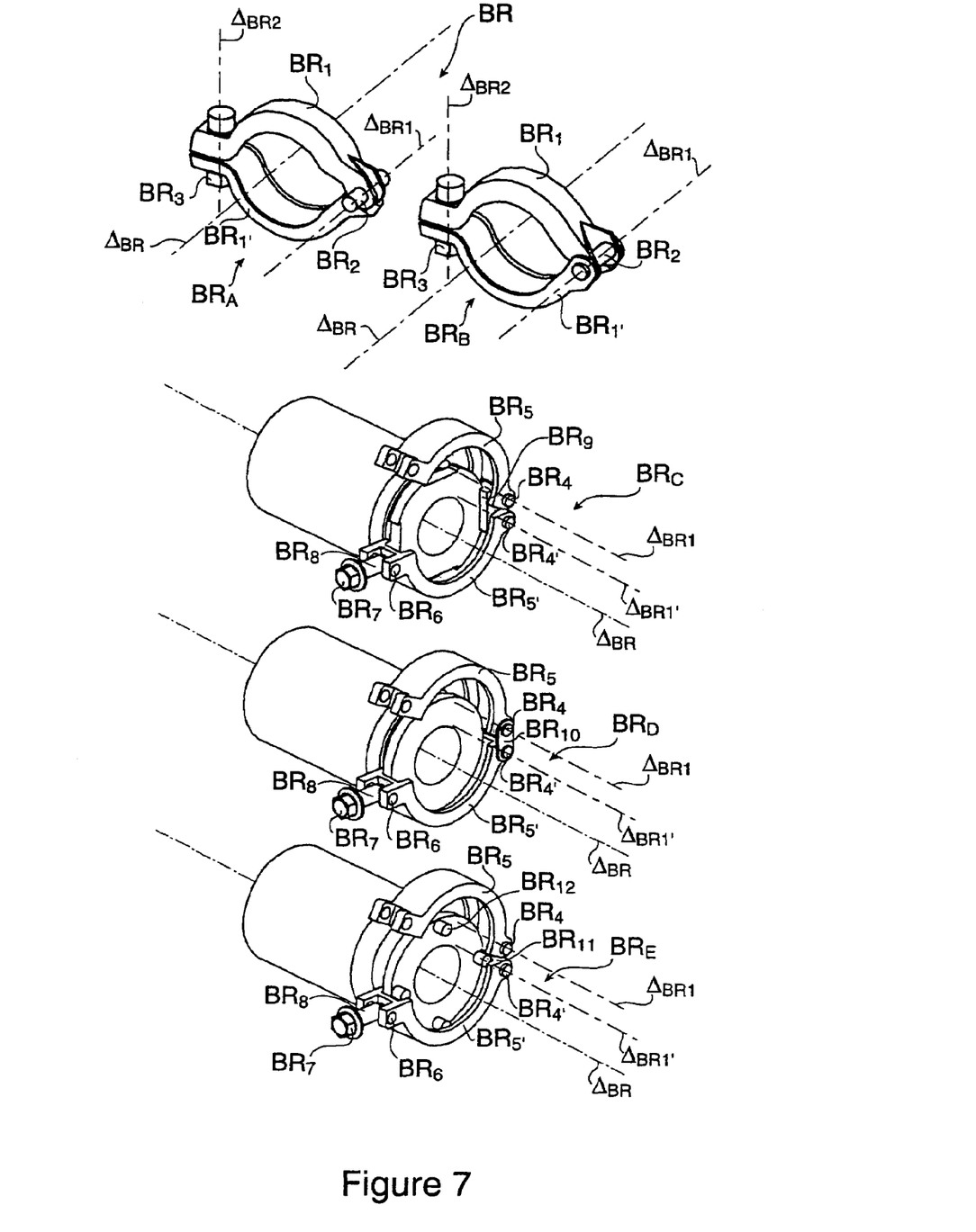
FIG. 7 is a perspective view of clamps.

In the example shown in FIG. 7, five types of clamp BRA, BRB, BRC, BRD and BRE are proposed as examples. Clamps BRA and BRB are composed of two half collars associated with a swivel-pin. Clamps BRC, BRD and BRE are composed of two half collars associated with two swivel-pins.

In addition, said half collars are tightened at the end opposite to that including either two swivel-pins of a locking device, or by a bolt bearing upon the two half collars, or by a shoulder-head screw, hinged on one of the two half collars and bearing upon the other half-collar.

Each of the two half collars includes a throat of trapezoidal section and of a shape that corresponds with the two cheek-plates of circular section corresponding to the two elements which have to be brought together. These elements can be connecting elements EL, non-adjustable terminal elements ET, adjustable terminal elements ETR, transition elements ETT associated with junction elements EJ, or basic transition elements associated with the basic element EB.

In a more precise manner, the aforementioned clamp BRA includes two half collars BR1 and BR1', hinged at one of their ends by means of a swivel-pin BR2, where the length of the aforementioned swivel-pin BR2 is greater than the width of said half collars BR1 AND BR1'. In addition the axis $\Delta$BR1 of said swivel-pin BR2 is parallel to the central axis $\Delta$BR of the clamp BRA.

A bolt BR3, whose principal axis $\Delta$BR2 is perpendicular to the central axis $\Delta$BR of the clamp BRA, bears upon the ends of the two half collars opposite to the aforementioned swivel-pin BR2.

This type of clamp can be used essentially in the case where the respective angular positioning of the two cheek-plates, corresponding to the two elements which have to be brought together, is not necessary.

The aforementioned clamp BRB includes two half collars BR1 AND BR1', hinged at one of (heir ends by means of a swivel-pin BR2, where the length of the aforementioned swivel-pin BR2 is at least equal to the width of said half collars BR1, BR1'. In addition, the axis $\Delta$BR1 of said swivel-pin BR2 is parallel to the central axis $\Delta$BR of the clamp BRB.

A bolt BR3, whose principal axis $\Delta$BR2 is perpendicular to the central axis $\Delta$BR of the clamp BRB bears upon the ends of the two half collars opposite to the aforementioned swivel-pin BR2.

In addition, the ends of the two half collars associated with the aforementioned swivel-pin BR2 are pierced so as to free the corresponding portion of the aforementioned swivel-pin BR2.

This type of clamp can essentially be used in the case where respective angular positioning of the two cheek-plates, corresponding to the two elements which have to be brought together, is necessary. In this case, the aforementioned corresponding portion of the swivel-pin BR2 will slot into an indentation, described previously, machined into the two cheek-plates.

The aforementioned clamp BRC includes two half collars BR5 and BR5', hinged at one of their ends by means of two swivel-pins BR4 and BR4', where the length of the aforementioned swivel-pins BR4 and BR4' is at least equal to the width of said half collars BR5 and BR5'. In addition the axes $\Delta$BR1 and $\Delta$BR1' of said swivel-pins BR4 and BR4' are parallel to the central axis $\Delta$BR of the clamp BRC. The swivel-pins BR4 and BR4' are held apart by a shim BR9 which has a flat surface oriented toward the central axis $\Delta$BR and parallel to said central axis $\Delta$BR.

A locking device, including a threaded sleeve BR8, hinged on the end of one of the two half collars opposite to the aforementioned swivel-pins BR4 and BR4', by means of an axle BR6, and a shoulder-head screw BR7 bearing upon the end of the other of the two half collars opposite to the aforementioned swivel-pins BR4 and BR4', employs a tightening operation on the aforementioned shoulder-head screw BR7 in the threaded sleeve BR8, to tighten the two half collars BR5 and BR5'. This type of clamp can essentially be used in the case where the respective angular positioning of the two cheek-plates, corresponding to the two elements which have to be brought together, is necessary in this case, the aforementioned shim BR9 will press against a flat part machined on the two cheek-plates.

The aforementioned clamp BRD includes two half collars BR5 and BR5', hinged at one of their ends by means of two swivel-pins BR4 and BR4', where the length of the aforementioned swivel-pins BR4 and BR4' is at least equal to the width of said half collars BR5 and BR5'. In addition the axes $\Delta$BR1 and $\Delta$BR1' of said swivel-pins BR4 and BR4' are parallel to the central axis $\Delta$BR of the clamp BRC. The swivel-pins BR4 and BR4' are held apart by two shims BR10 and BR10', which are not shown.

A locking device, including a threaded sleeve BR8, hinged on the end of one of the two half collars opposite to the aforementioned swivel-pins BR4 and BR4' by means of an axle BR6, and a shoulder-head screw BR7 bearing upon the end of the other of the two half collars opposite to the aforementioned swivel-pins BR4 and BR4', employs a tightening operation on the aforementioned shoulder-head screw BR7 in the threaded sleeve BR8 to tighten the two half collars BR5 and BR5'.

This type of clamp can essentially be used in the case where the respective angular positioning of the two cheek-plates, corresponding to the two elements which have to be brought together, is not necessary.

The aforementioned clamp BRE includes two half collars BR5 and BR5', hinged at one of their ends by means of two swivel-pins BR4 and BR4', where the length of the aforementioned swivel-pins BR4 and BR4' is at least equal to the width of said half collars BR5 and BR5'. In addition the axes $\Delta$BR1 and $\Delta$BR1' of said swivel-pins BR4 and BR4' are parallel to the central axis $\Delta$BR of the clamp BRC. The swivel-pins BR4 and BR4' are held apart by a shim BR11.

A locking device, including a threaded sleeve BR8, hinged on the end of one of the two half collars opposite to the aforementioned swivel-pins BR4 and BR4' by means of an axle BR6 and a shoulder-head screw BR7 bearing upon the end of the other of the two half collars opposite to the aforementioned swivel-pins BR4 and BR4', employs a tightening operation of the aforementioned shoulder-head screw BR on the threaded sleeve BR8 in order to tighten the two half collars BR5, BR5'.

This type of clamp can essentially be used in the case where the respective angular positioning of the two cheek-plates, corresponding to the two elements which have to be brought together, is necessary. In this case, at least one swivel-pin BR12 fitted to one of the two cheek-plates will allow the other cheek-plate to be positioned.

Figure 8:
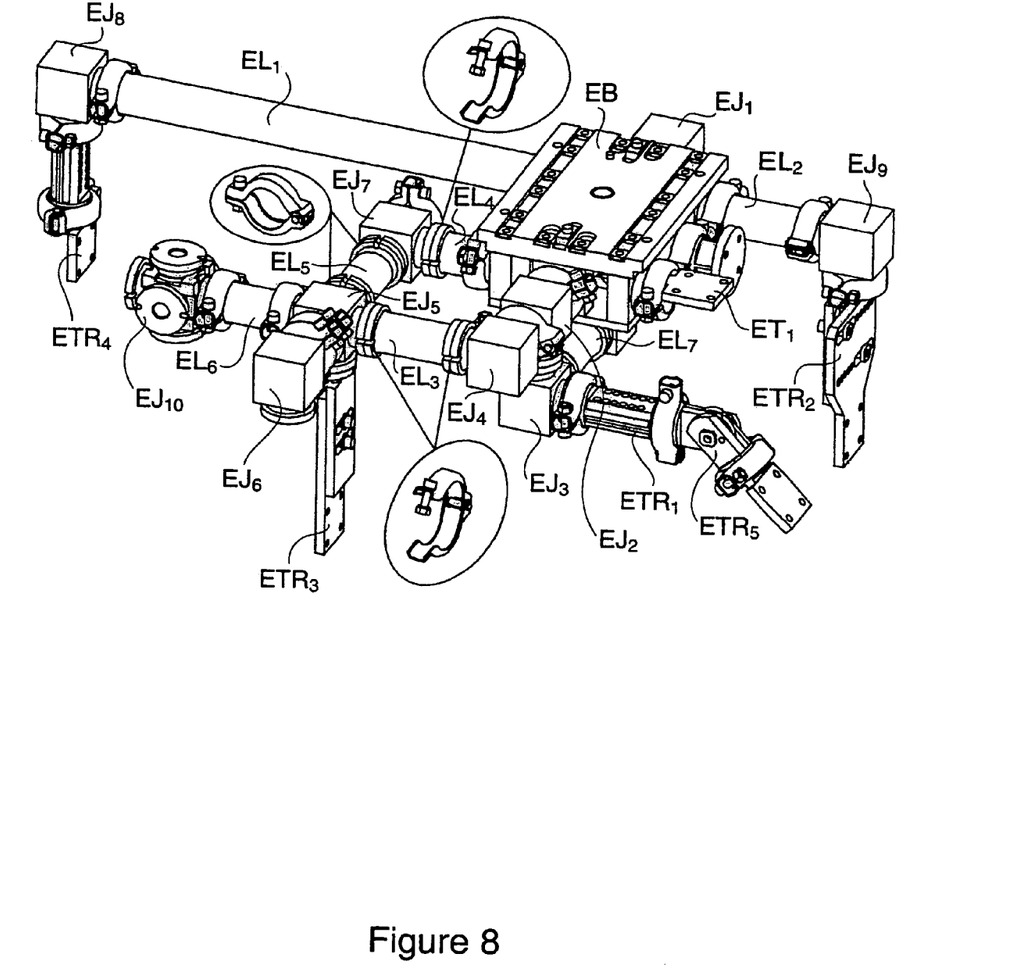
FIG. 8 is an example of the assembly of standard elements.

In the example shown in FIG. 8, an assembly of standard elements according to the invention is proposed, providing an overview if the capabilities provided by the various elements described above.

A basic element EB is equipped with eight junction elements EJ (shown partially), brought together with the basic element EB by eight basic transition elements (not shown).

Connecting elements EL1, EL2, EL3, EL4, EL5, EL6 and EL7 are either firmly attached to each other by junction elements EJ2, EJ3, EJ4, EJ5, EJ6 and EJ7 or firmly attached to the basic element EB.

A non-adjustable terminal element ET1 is attached to the basic element EB.

Adjustable terminal elements ETR1, ETR2, ETR3 and ETR4 are attached to junction elements EJ3, EJ5, EJ8 and EJ9. Junction elements EJ1, EJ6 and EJ10 are available for other attachments.

An adjustable terminal element ETR5 is attached to another adjustable terminal element ETR1.

The clamps used for the attachments between these different elements are shown partially.

Thus, this example of a gripper will have five bearing surfaces, positioned and oriented with precision in relation to the reference surface represented by the top surface of the basic element EB.

Given the possible adjustments offered by the adjustable terminal elements ETR1, ETR2, ETR3 and ETR4, any finishing work connected with the geometry of the mechanical parts to be processed will thus be facilitated.

The replacement of elements or the addition of other elements can easily be envisaged without compromising the initial structure.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An assembly of precision mechanical structure, said assembly including:

a basic element having a top plate and a bottom plate;

a plurality of basic transition elements arranged between and in contact with said top plate and said bottom plate, said basic transition elements having a parallelepiped body, a connecting member extending from a surface of said body, and a cheek plate arranged at an end of said connecting member;

a linking element having a contact face on each end thereof, said linking element connected to one of said basic transition elements on one of said contact faces; and a clamp having two half collars, said collars having a shape that corresponds to the shape of said contact faces of said elements and said linking element, tightening of said half collars engages and centers one of said contact faces of said linking element to said contact face of one of said elements.

2. The assembly of claim 1 wherein said top plate having a rectangular shape and at least one groove in a surface of said top plate.

3. The assembly of claim 1 wherein said bottom plate having a rectangular shape and an opening therethrough.

4. The assembly of claim 3 further including an inspection plate arranged within said opening.

5. The assembly of claim 1 wherein said cheek plate having at least one indentation having a predetermined width on a periphery thereof.

6. The assembly of claim 5 wherein said width equals a diameter of a pin of said clamp.

* * * * *

UNITED STATES PATENT AND TRADEMARK OFFICE
CERTIFICATE OF CORRECTION

PATENT NO. : 7,331,104 B2
APPLICATION NO. : 10/977148
DATED : February 19, 2008
INVENTOR(S) : Philippe Carasso et al.

It is certified that error appears in the above-identified patent and that said Letters Patent is hereby corrected as shown below:

Col. 2, Line 12 - Please delete "feces" and insert -- faces -- after "two contact"

Col. 5, Line 25 - Please delete "clement" and insert -- element -- after "rotate in the fixed"

Col. 7, Line 40 - Please delete "(heir" and insert -- their -- after "hinged at one of"

Signed and Sealed this

Tenth Day of June, 2008

JON W. DUDAS
*Director of the United States Patent and Trademark Office*